US009673996B1

(12) United States Patent
Upadhyay et al.

(10) Patent No.: US 9,673,996 B1
(45) Date of Patent: Jun. 6, 2017

(54) REDIRECTION OF A STREAMING MEDIA SESSION IN AN ANTICIPATED FAILOVER SCENARIO

(75) Inventors: Piyush Upadhyay, Mission, KS (US); Badri Subramanyan, Overland Park, KS (US); Hemanth Pawar, Herndon, VA (US); Shilpa Kowdley Srinivas, Herndon, VA (US); Vivek Kurisunkal, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1286 days.

(21) Appl. No.: 12/166,455

(22) Filed: Jul. 2, 2008

(51) Int. Cl.
*H04L 12/803* (2013.01)
*H04L 12/853* (2013.01)
*H04L 12/54* (2013.01)

(52) U.S. Cl.
CPC .......... *H04L 12/56* (2013.01); *H04L 47/125* (2013.01); *H04L 47/2416* (2013.01)

(58) Field of Classification Search
USPC .............................................. 709/231; 725/4
See application file for complete search history.

(56) References Cited

U.S. PATENT DOCUMENTS

| | | | |
|---|---|---|---|
| 5,892,915 A * | 4/1999 | Duso et al. ................... 709/219 |
| 6,195,680 B1 * | 2/2001 | Goldszmidt et al. ......... 709/203 |
| 6,415,323 B1 * | 7/2002 | McCanne et al. ............ 709/225 |
| 6,839,865 B2 | 1/2005 | Gould et al. |
| 6,910,078 B1 | 6/2005 | Raman et al. |
| 7,054,949 B2 * | 5/2006 | Jennings ....................... 709/238 |
| 7,076,555 B1 | 7/2006 | Orman et al. |
| 7,159,234 B1 | 1/2007 | Murphy et al. |
| 7,168,086 B1 | 1/2007 | Carpenter et al. |
| 7,181,523 B2 * | 2/2007 | Sim ............................... 709/226 |
| 7,318,107 B1 * | 1/2008 | Menon .......................... 709/239 |
| 8,175,036 B2 * | 5/2012 | Visuri et al. .................. 370/328 |
| 2002/0116452 A1 | 8/2002 | Johnson et al. |
| 2003/0007515 A1 * | 1/2003 | Apostolopoulos et al. .. 370/503 |

(Continued)

FOREIGN PATENT DOCUMENTS

WO    WO 2006007929 A1    1/2006

OTHER PUBLICATIONS

"Intelligent Automatic Failover Technology—Automatic Switch Over (ASO)," SinoCDN Limited, Aug. 2001.

(Continued)

*Primary Examiner* — Asghar Bilgrami (57) ABSTRACT

Disclosed herein is a method and system for providing streaming media to a client device. Specifically, in a streaming media session that is initially ongoing between a content server and a client device via a first proxy server: (i) the first proxy server may determine that an interruption in the streaming media session is going to occur and responsively (a) send a transfer request to the client device and (b) send session information to a second proxy server, the session information comprising information identifying the streaming media session and a progress indicator that indicates a current status of the streaming media session, and (ii) after the transfer request and the session information is sent, continuing the streaming media session via the second proxy server. The second proxy server uses the progress indicator as a basis to continue the streaming media session with the client device.

16 Claims, 4 Drawing Sheets

(56) References Cited

U.S. PATENT DOCUMENTS

| | | | |
|---|---|---|---|
| 2006/0173974 A1* | 8/2006 | Tang | 709/217 |
| 2006/0248212 A1* | 11/2006 | Sherer et al. | 709/231 |
| 2007/0168523 A1 | 7/2007 | Jiang et al. | |
| 2008/0195761 A1* | 8/2008 | Jabri et al. | 709/250 |
| 2008/0209067 A1* | 8/2008 | John et al. | 709/231 |
| 2009/0110132 A1 | 4/2009 | Kondrad et al. | |

OTHER PUBLICATIONS

"Darwin Streaming Server failover," http://lists.apple.com/archives/Streaming-server-users/2002/Aug//msg00039.html, Aug. 5, 2002, printed from the World Wide Web.

"RTSP Redirect: msg#00142," http://osdir.com/mil/video.livedotcom.devel/2006-11/msg00142.html, printed from the World Wide Web on Feb. 19, 2008.

* cited by examiner

REDIRECTION OF A STREAMING MEDIA SESSION IN AN ANTICIPATED FAILOVER SCENARIO

BACKGROUND

As Internet connections become faster and more prevalent, one area of particularly fast growth has been the streaming of real-time media such as video and audio content to client devices. Personal computers, laptops, cell phones, PDAs, and other such devices that are equipped with streaming media clients can engage in streaming media to receive pre-recorded or live media in real-time. Moreover, with the advent of wireless client devices, such as 3G and 4G mobile phones, users can receive and enjoy streaming media content without being tethered to a desk or another fixed location.

Advanced "multi-media" cell phones, for instance, now provide media-player applications through which a user can select from a number of streaming media channels much like radio stations or television channels. When a user selects a desired streaming media channel, the media player may then send a session request to a designated media server and, after receiving session description parameters (e.g., codec, bit rate, etc.) from the server, the media player may begin receiving and presenting the requested media stream to the user.

Occasionally, as data is streamed in real-time, an interruption in a streaming media session may cause playout of the media to cease. In some cases, when a session is interrupted, the user may be required to re-start the media session (i.e., the session cannot be continued from the point where the interruption occurred). As a result, service providers have implemented failback proxy servers, which can continue a media session if a primary proxy server disconnects.

OVERVIEW

A failback proxy server mirrors the primary proxy server in that it sets up the streaming media session and operates to retrieve the media to be sent out at the same time as the primary proxy server. Thus, the failback proxy server differs in that the failback server does not send the retrieved media along to the client device when the primary proxy server is functional. The failback proxy server connects to the client and streams the media to the client, in the event that the primary proxy server goes offline.

Configuring a failback proxy server to mirror a primary proxy server wastes processing resources and/or network resources. The purpose of mirroring the primary server in is ensuring that the failback proxy server can continue the session from the same point if an interruption occurs. However, data is continually retrieved and queued by the failback proxy server, but rarely if ever sent to the client, which results in inefficient use of network resources. Thus, a system including a failback proxy server that does not mirror the primary proxy server, but nonetheless allows for a streaming session to be resumed at the point of interruption, is desirable. Accordingly, a method and system for providing streaming media using a resource-efficient failback proxy server, is disclosed herein.

In one aspect, a method for providing streaming media to a client device is disclosed. The method may be carried out while a streaming media session is initially ongoing between a content server and a client device via a first proxy server. The method comprises the first proxy server determining that an interruption in the streaming media session is going to occur and responsively (a) sending a transfer request to the client device and (b) sending (i) session information to a second proxy server, the session information comprising information identifying the streaming media session and (ii) a progress indicator that indicates a current status of the streaming media session; and (b) after the transfer request and the session information is sent, continuing the streaming media session via the second proxy server. The second proxy server may use the progress indicator as a basis to resume the streaming media session with the client device.

More specifically, to continue the streaming media session via the second proxy server, the first proxy server or the second proxy server may send a transfer request to the client device. The transfer request indicates that the session is being transferred to the second proxy server. The transfer request may be followed by a continuation request, which is sent by either the first or second proxy server, and indicates to the client device that the device should resume the session with the second proxy server. To implement the transfer and continuation requests in an exemplary embodiment, certain extensions of Real-time Streaming Protocol (RTSP) are defined herein. Specifically, the transfer request may take the form of an RTSP PROXY_TRANSFER request, and the continuation request may take the form of an RTSP CONTINUE request.

In another aspect, a system for providing streaming media to a client device is disclosed. The system comprises a first proxy server configured to, while a streaming media session is initially ongoing between a content server and the client device via the first proxy server, determine that an interruption in the streaming media session is going to occur, and responsively: (a) send a transfer request to the client device and (b) send to a second proxy server (i) session information, the session information comprising information that identifies the streaming media session and (ii) a progress indicator that indicates a current status of the streaming media session. The second proxy server is configured to receive the session information and in response to receiving the session information (a) send a continuation request to the client device and (b) use the progress indicator as a basis to resume the streaming media session with the client device.

In another aspect, a client device configured to engage in a streaming media session is disclosed. The device is operable to (i) while a streaming media session is initially ongoing between the client device and a content server via a first proxy server, receive a request from a proxy server, wherein the request indicates that (a) an interruption in the streaming media session is going to occur and (b) the streaming media session is going to be transferred to a second proxy server and (ii) in response to the request from the proxy server, send the second proxy server a request to continue the streaming media session. Further, after sending the request to continue the streaming media session, the device may be configured to continue the streaming media session with the content server via the second proxy server.

The proxy server which sends the request indicating that an interruption is going to occur may be the first proxy server or the second proxy server. Further, the request may be a transfer request, such as an RTSP PROXY_TRANSFER request. The receiver may be further configured to, after a transfer request is received, receive a continuation request from the first or second proxy server and in response, send the request to continue the streaming media session. The request to continue the streaming media session may comprise, for example, an RTSP PLAY request.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
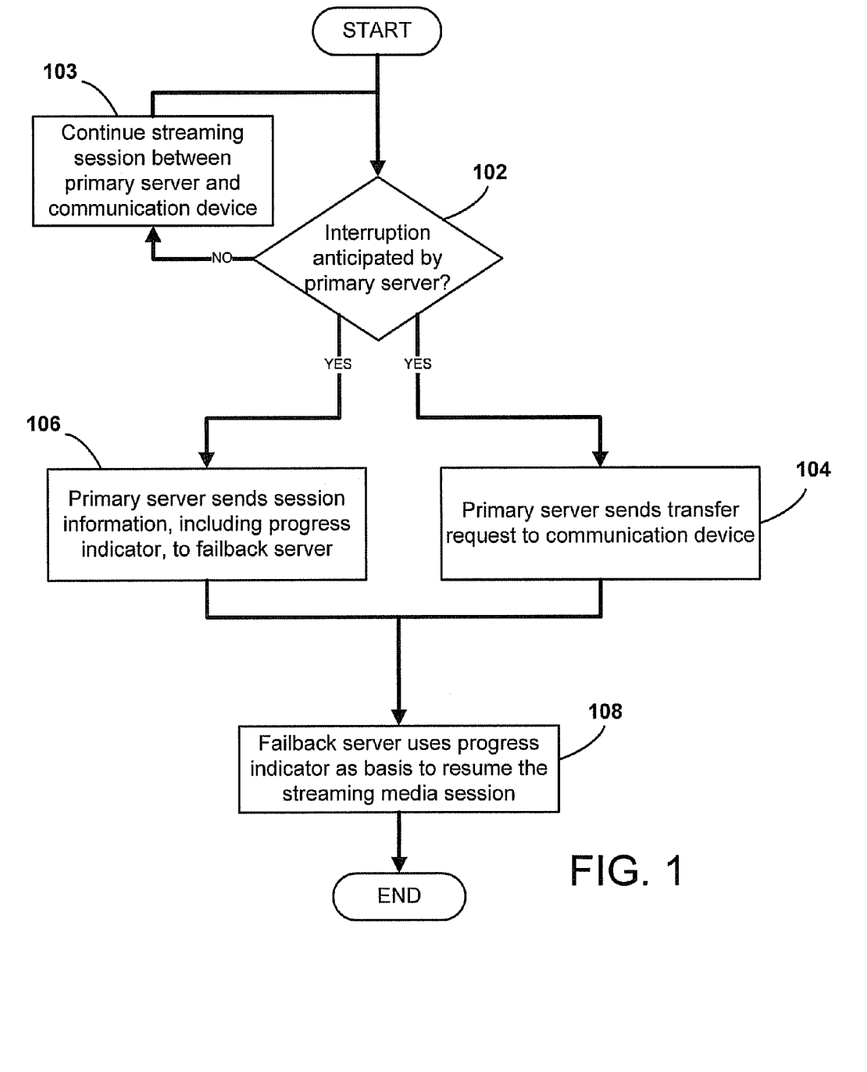
FIG. 1 is a flow chart illustrating a method for providing streaming media to a client device, according to an exemplary embodiment of the invention.

FIG. 1 is a flow chart illustrating a method for providing streaming media to a client device. The method may be carried out by at least two proxy servers, which preferably include a primary proxy server and a failback proxy server. The method may be carried out while a streaming media session is initially ongoing between a content server and a client device via the primary proxy server. These proxy servers may be operated, and the method implemented, by a communication service provider or an independent entity working with a service provider, as examples.

During the streaming media session, the primary proxy server may determine that an interruption in the streaming media session is going to occur, as shown by block 102. For example, the primary proxy server may determine or receive notification that a network outage is going to occur, which will prevent data from being sent between the primary proxy server and the client device. The network outage may be scheduled or unscheduled. As another example, the primary proxy server may, based on network conditions, determine that a network outage is likely to occur. For instance, if the data rate between the primary proxy server and the client device has dropped below a predetermined rate, or if a predetermined percentage of data packets are being dropped, the primary proxy server may conclude that an interruption is going to occur. More generally, a network outage may be anticipated from any conditions indicating a hardware or software failure is possible. Further, the anticipated interruption need not be a complete outage, rather the network outage may be any scenario where the primary proxy server cannot function optimally. Other examples are also possible. If the primary proxy server does not anticipate that an interruption is going to occur, the primary proxy server simply continues to stream media to the client device, as shown by block 103.

In response to the determination that interruption is likely to occur, the primary proxy server may initiate actions to transfer the session to the failback proxy server. In particular, the primary proxy may send session information that identifies the ongoing streaming media session to the failback proxy server, as shown by block 106. The session information includes a progress indicator indicating the state of the session at or near the time when the session will be transferred to the failback proxy server, and/or other session information. In particular, the session information sent to the failback proxy server may include (i) a session identifier, (ii) an identifier for the client device, and (iii) data indicating the state of the session at the time the session was paused. However, the session information sent to the failback proxy server may include more or less information, so long as the failback proxy server can use the session information to continue the session from the point when the session was paused.

In addition, when the primary proxy server determines that an interruption is going to occur, the primary proxy server may send a transfer request to the client device, as shown by block 104. The transfer request may indicate to the client device that the session is being transferred to the failback proxy server. Additionally or alternatively, the transfer request may pause the streaming media session, or may indicate to the client device that the device should pause the streaming media session. Pausing the streaming media session may stop the streaming media session while preserving session information that identifies and/or describes the ongoing session. In an alternative embodiment, the failback proxy server may send the transfer request to the client device. The failback proxy may do so after it has received the session information from the primary proxy.

In an exemplary embodiment, the failback proxy server uses the progress indicator, which is included in the session information, to continue the streaming media session with the client device, as shown by block 108. To continue the session, the failback proxy server may send a continuation request to the client device. The continuation request may indicate to the client device that the client device should re-establish the session in the state indicated by the progress indicator, with the failback proxy server. Alternatively, the failback proxy server may continue the session, by simply resuming the session at or near the point where the primary server discontinued the session, without sending a continuation request. In such embodiments, the transfer request may provide the client device with sufficient information to continue the session, without an additional continuation request.

Figure 2:
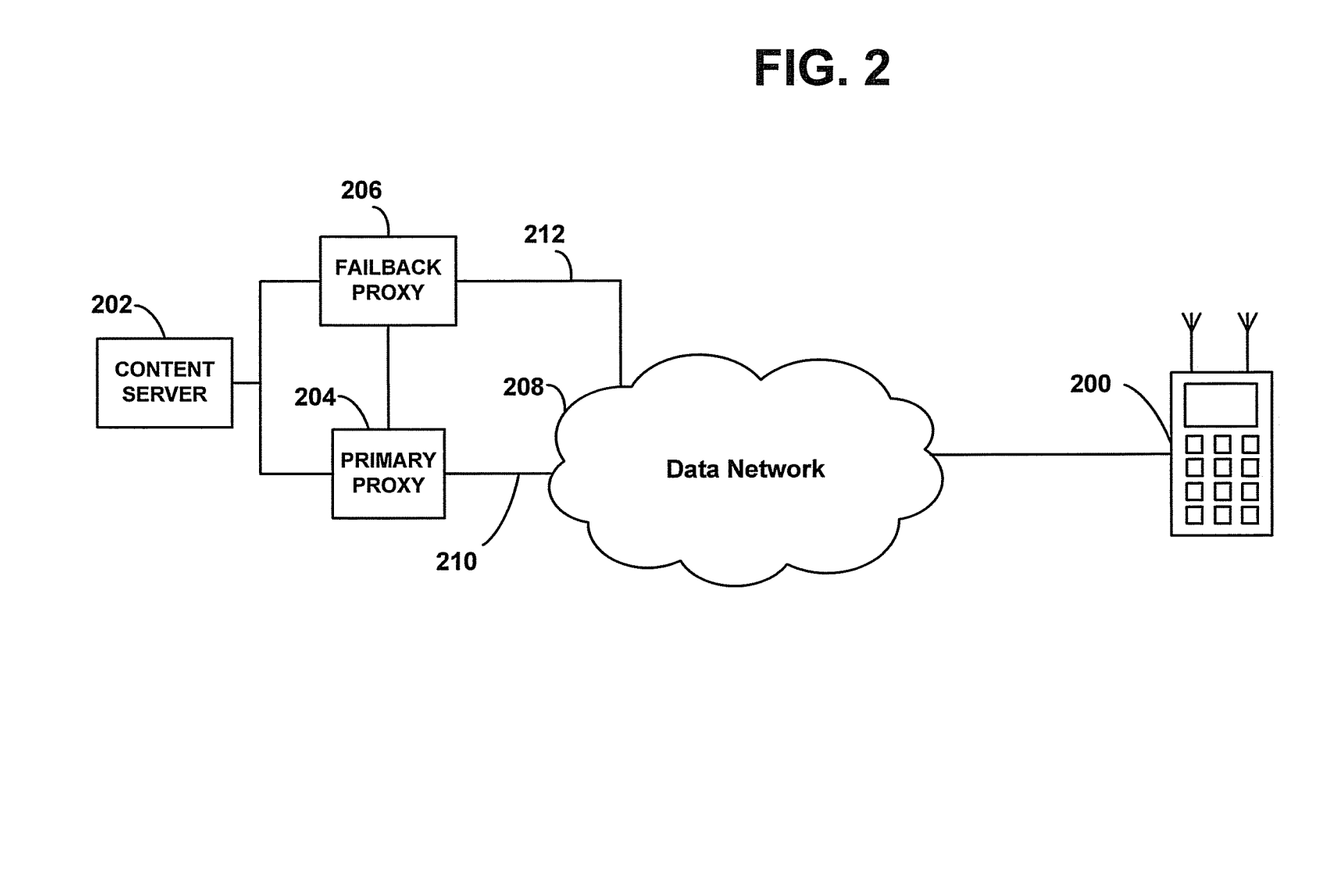
FIG. 2 is a simplified block diagram depicting a system for providing streaming media to a client device, according to an exemplary embodiment of the invention.

FIG. 2 is a block diagram illustrating a simplified system for providing streaming media to a client device 200. The system includes a content server 202, a primary proxy server 204, and a failback proxy server 206, all or some of which may communicate with client device 200 via data network 208. Both the primary proxy server 204 and the failback proxy server 206 are configured to communicate with content server 202. Further, primary proxy server 204 and failback proxy server 206 may be configured to communicate with each other. The communication paths between content server 202, primary proxy server 204, failback proxy server 206, and data network 208 may be direct or indirect connections (e.g., single-hop or multi-hop connections with other entities in the communication path between two servers). Further, these communication paths may be implemented using wired and/or wireless connections.

Generally, primary proxy server 204 may function as a gateway to content server 202. In particular, primary server 204 may receive requests for streaming media from client device 200, retrieve the requested media from content server 202, and stream the requested media to the device.

Primary proxy server 204 may also be configured to determine when an interruption in an ongoing streaming media session with device 200 is going to occur. Specifically, it may determine that a scheduled or unscheduled network outage is affecting or will affect the integrity of the data path between primary server 204 and device 200. When such a determination is made, primary proxy server 204 is configured to transfer the session to failback proxy server 206. To do so, primary proxy server 204 may send session information to failback proxy server 206, which allows the failback proxy to continue the session at or near the point in media session at which the interruption occurs.

In addition, either primary proxy server 204 or failback proxy server 206 may send a transfer request to client device 200. The transfer request may indicate to device 200 that the session is being transferred from primary proxy server 204 to failback proxy server 206. Optionally, primary proxy server 204 sends session information to failback proxy server 206, a continuation request may also be sent to device 200 (either by the failback proxy, or by the primary proxy), indicating that the failback proxy is ready to resume the session.

Figure 3:
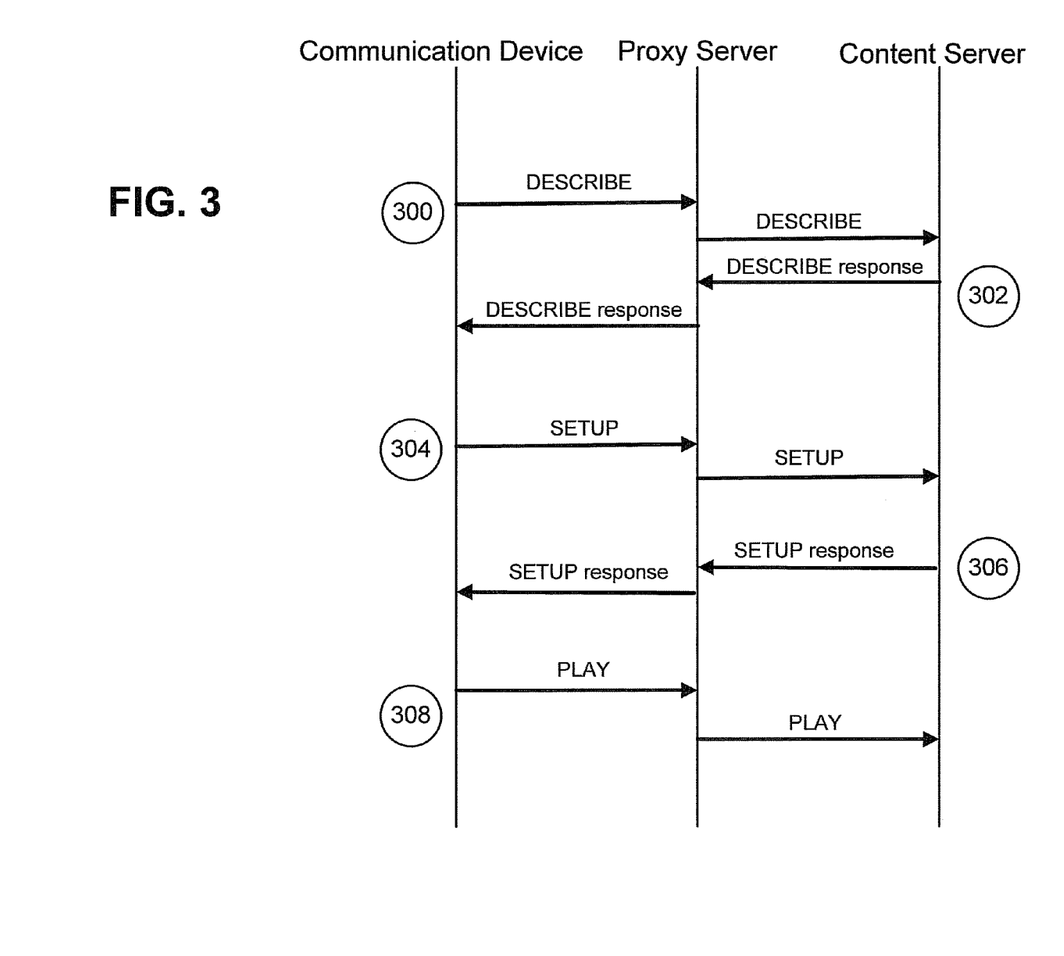
FIG. 3 is a simplified signal flow diagram depicting an exemplary series of RTSP commands to initiate a streaming media session, according to an exemplary embodiment of the invention.

In an exemplary embodiment, a streaming media session is set up and controlled using RTSP. FIG. 3 shows an exemplary series of RTSP commands that may be used to initiate a streaming media session between a content server and a client device via a proxy server. In this example, a proxy acts as a front end, providing access to the media to be streamed to the client device, and forwarding the media to the device. However, a client device may also establish a streaming media session directly with the primary proxy server. Furthermore, one skilled in the art will recognize that an RTSP session may be initiated in various ways, depending on the type of streaming service being provided (e.g., unicast, single stream container files, live media using multicast, etc.).

The client device may initialize a media session by sending an RTSP DESCRIBE request 300, which requests a description of the desired media content, to a proxy server. The proxy server then forwards the DESCRIBE request to the content server. In response, the content server sends an RTSP response 302 to the client device, via the proxy server, which includes an RTSP URL for the requested content and/or other parameters associated with streaming the requested content. It should be understood that the device may obtain a description of the media content by other means, such as an HTTP GET request, in which case an RTSP DESCRIBE request may be unnecessary.

Provided with a description of the media content, the client device may send an RTSP SETUP request 304 to the proxy server, which the proxy forwards to the content server. The proxy server may then receive an RTSP SETUP response 306, which describes parameters and/or characteristics of the session, from the content server, and send the RTSP SETUP to the client device. In particular, the response may include a session identifier, uniquely identifying the streaming media session.

After a successful SETUP request, the client device may send an RTSP PLAY message 308 to the primary proxy server to initiate the streaming media session. The PLAY request may include a session-ID, associating the particular streaming media session with client device (as the same media may be streamed to multiple clients, resulting in multiple sessions). Upon receiving the PLAY request, the primary proxy server begins sending the requested content to client device. Once the session is established, the client device, or any other authorized entity, such as the primary proxy server or a failback proxy server, can control the session using RTSP.

In an exemplary embodiment, the proxy server, which accesses the media content via a content server may forward some or all of the requests received from the client device to the content server (as shown in FIG. 3). Alternatively, the proxy server may simply download the requested content from the content server, so that the content can be streamed to the client device. Further, in any embodiment, the proxy server may store, on a temporary or permanent basis, content that has previously been requested and streamed from the proxy server. If the content is stored at the proxy server, the proxy server may stream the stored content to the client device.

Specifically, the proxy may ascertain whether it has an up-to-date copy of the continuous media content and its description. The proxy may determine whether its stored copy is up-to-date by sending a SETUP or DESCRIBE request, and comparing the Last-Modified header it receives in response, with that of a cached copy. If the copy is not current, the proxy may modify the SETUP transport parameters as appropriate to retrieve a current copy from the content server. Subsequent control commands, such as a PLAY request, can then pass the proxy without modification.

Figure 4:
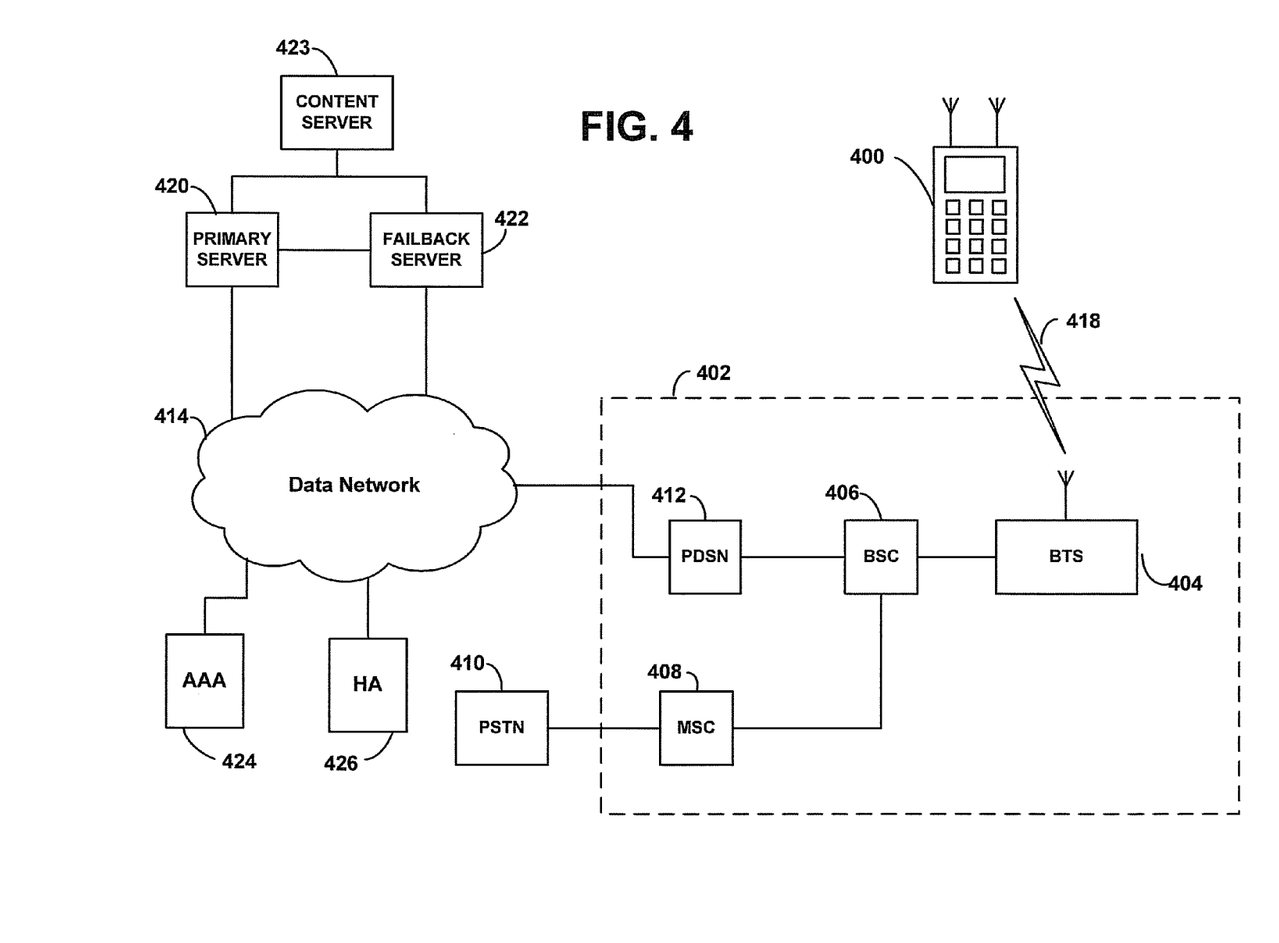
FIG. 4 is a simplified block diagram depicting a system for providing streaming media to a client device, according to an exemplary embodiment of the invention.

FIG. 4 is a simplified block diagram depicting an exemplary system for providing streaming media to a client device. In FIG. 4, the depicted system is a wireless communication system including a radio access network (RAN) 402, and the depicted client device is a wireless client device 400. RAN 402 provides access to wireless services (e.g., cellular phone service; wireless data service, etc.) available from a wireless service provider. The RAN 402 may include a base station or base transceiver station (BTS) 404, a base station controller (BSC) 406, and a mobile switching center (MSC) 408. However, one skilled in the art will recognize that the method and system described herein can be implemented in both wired and wireless communication systems. Further, streaming media may be provided to both wired and wireless client devices.

Client device 400 may engage in communications via BTS 404, BSC 406, and/or MSC 408. For example, client device 400 may engage in voice communications with public switched telephone network (PSTN) 410 via MSC 408. As another example, client device 400 may engage in data communications via packet data serving node (PDSN) 412, which provides access to a packet switched network 414 (such as the Internet, for instance). Further, the RAN 402 may provide multiple types of communication services, in addition, or as an alternative to, the communication services described herein.

Sitting as nodes on data network 414 are primary proxy server 420 and failback proxy server 422. Primary proxy server 420 and failback proxy server 422 may be configured to communicate with each other via data network 414, via a wired or wireless connection, and/or via other communication paths (both direct, i.e. single-hop, and indirect, i.e. multi-hop, communication paths). Client device 400 may be configured to send communications to, and receive communications from, content server 423 via primary proxy server 420 and/or failback proxy server 422. Also sitting as nodes on data network 414 are, by way of example, an authentication, authorization, and accounting ("AAA") server 424, and a mobile-IP home agent ("HA") 426.

To establish packet-data communications, client device 400 may send a request for a channel assignment via BTS 404, BSC 406, PDSN 412, and network 414, to AAA server 424. Then, after AAA server 424 authenticates client device 400, HA 426 may assign an IP address for use by client device 400. Client device 400 may then engage in packet-data communications with entities such as primary proxy server 420 and failback proxy server 422, via a communication path comprising air interface 418, BTS 404, BSC 406, PDSN 412, and data network 414. Further, the packet control function (PCF) of BSC 406 may regulate packet flow through the RAN to client device 400. As such, the PCF may allow the BTS to access and extract data and information from packet-data communications established via the BTS.

Communications over an air interface are typically divided into forward-link communications, which are those passing from the base station to the client device, and reverse-link communications, which are those passing from the client device to the base station. In addition, client device 400 may communicate over air interface 418 according to various air interface protocols. As an example, client device 400 may engage in packet-data communications using a high rate packet data ("HRPD") system, which can be defined by industry standard IS-856 (sometimes referred to as "EVDO").

To acquire packet-data connectivity under IS-856, after a client device 400 first detects an IS-856 carrier, client device 400 sends to its BSC 406 a Universal Access Terminal Identifier ("UATI") request, and receives in response an International Mobile Station Identifier ("IMSI"), which the client device 400 can then use to identify itself in subsequent communications with the BSC 406. The client device 400 then sends a connection-request to the BSC 406, and the BSC 406 responsively invokes a process to authenticate client device 400 and to have the client device acquire a data link.

In particular, the BSC 406 sends an access request to an Access Network AAA ("ANAAA") server (which may be different than the AAA server 424 shown in FIG. 4), and the ANAAA server authenticates client device 400. The BSC 406 then assigns radio resources for the data session, by directing client device 400 to operate on a particular time-slot traffic channel on the forward link and a particular Walsh-coded traffic channel on the reverse link. Further, the BSC 406 signals to the PDSN 412, and the PDSN and client device 400 then negotiate to establish a point-to-point protocol (PPP) data link. Client device 400 then sends a Mobile-IP Request to PDSN 412, which the PDSN forwards to the HA 426, and the HA assigns a mobile-IP address for the client device to use. Once client device 400 acquires a mobile-IP address, the client device can engage in packet-data communications.

Primary proxy server 420 and failback proxy server 422 may serve as gateways to content server 423, which in turn is configured as a streaming media server. As such, client device 400 may access media content that is stored on or accessible to content server 423, via RAN 402 (and specifically BTS 404, BSC 406 and PDSN 412), data network 414, and primary proxy server 420 or failback proxy server 422. However, it should be understood that client devices connecting to data network 414 using means other than RAN 402 may also be provided with streaming media by primary proxy server 420 and/or failback proxy server 422. For example, a client device may access data network 414, and through it primary proxy server 420 or failback proxy server 422, using an Ethernet connection, a modem, or a wireless protocol such as 802.11x or WiMAX, among other possibilities.

By connecting to primary proxy server 420 and/or failback proxy server 422, a client device may engage in a streaming media session. A streaming media session may involve primary proxy server 420 and/or failback proxy server 422 requesting and receiving media content from content server 423, and forwarding the media content on to client device 400 in real-time. When the client device receives media content or a media file in real-time, the client device plays the media file as the file is received, rather than waiting to receive the entire file before initiating playback. In some real-time sessions, the client device may utilize a buffer, pre-loading a portion of the media as a preventative measure, should network conditions become less favorable. Media files that can be streamed include files formatted for audio-visual, auditory or textual display, as well as other types of media files and/or formats. The media may be streamed using the industry standard Real-time Transport Protocol ("RTP"—Internet Engineering Task Force ("IETF") Request for Comments ("RFC") 3550), or may be streamed by other methods. An RTP streaming session may be controlled using RTSP and/or other control protocols.

Primary proxy server 420 is configured to determine when an interruption in an ongoing streaming media session is going to occur. By determining in advance that a streaming media session will be interrupted, primary proxy server 420 can initiate a transfer of the streaming media session to failback proxy server 422. In particular, when primary proxy server 420 determines an interruption is going to occur, primary proxy server 420 may be configured to send a transfer request to client device 400. In addition, primary proxy server 420 may send session information, which identifies the session and includes a progress indicator, to failback proxy server 422.

The progress indicator indicates the status of the streaming media session and, in particular, indicates the status at or near the time when the session is transferred from the primary proxy server 420 to the failback proxy server 422. More specifically, the progress indicator may indicate a point in the streamed data where the data was paused by primary proxy server 420 and accordingly, the point where the failback proxy server 422 should continue the session. Thus, the progress indicator may provide a continuation point in scenarios where primary proxy server 420 is streaming content of a known duration to a client device, as well as scenarios where primary proxy server 420 is streaming live media or content of an unknown duration. As such, the progress indicator may take the form of a bookmark or timestamp identifying the point in the media file where the failback proxy server 422 should continue the session. Further, when primary proxy server 420 is streaming content of a known duration, the progress indicator may include an indication of the elapsed time or time remaining in the streaming media session as of the interruption.

Failback proxy server 422 is configured to receive session information, including session identification (ID) information and a progress indicator, from primary proxy server 420. Being configured to use both the session ID information and the progress indicator, failback proxy server 422 may re-establish the streaming media session with client device 400, at the point indicated by the progress indicator. Specifically, failback proxy server 422 is configured to use the progress indicator continue the streaming media session from substantially the same point where the session was paused. To do so, failback proxy server 422 may use the session ID information to send and request content, starting at or near the point where the interruption occurred, from content server 422.

Either failback proxy server 422 or primary proxy server 420 may send a transfer request to client device 400. The transfer request indicates to client device 400 that the session is being transferred to a different proxy server. As such, the request may identify the failback proxy as the server to which the session will be transferred. If the primary proxy sends the transfer request, the request may be sent to the client device before, after, or concurrently with sending the session information to the failback proxy. If the failback proxy sends the transfer request, the request may be sent to the client device in response to the failback proxy receiving the session information.

Failback proxy server 422 may also send a continuation request to client device 400. The continuation request indicates to the client device that the client device should continue the session with failback proxy server 422, rather than primary proxy server 420. In response to the continuation request, client device 400 may simply continue the session with failback proxy server 422 in the same manner as it would have with primary proxy server 422, had the interruption not occurred. Alternatively, a continuation request may indicate to client device 400 that client device 400 should re-establish the session with failback proxy server 422. Then, once client device 400 re-establishes the session with failback proxy server 422, the client device can proceed in the same manner as it would have with primary proxy server 422.

Ideally, the transfer of a streaming session from primary proxy server 420 to failback proxy server 422 is virtually transparent to a user of client device 400. For instance, if client device 400 has buffered some amount of the streaming media session, and the buffer is of adequate size, the client device 400 can continue playout of media while the session is transferred to the failback proxy server by using the buffered data. Moreover, even if no buffer is stored, or a smaller buffer is stored, the session can be transferred relatively quickly, so that the end user experiences, for example, a slight flicker (in the case of video) or a slight "skip" (in the case of audio), if the end user notices anything at all. However, it should be understood that, within the scope of the invention, network conditions or other circumstances may result in less-than-ideal transfers to the failback proxy server. Therefore, while the invention may help smooth transfer of a streaming media session between a primary and failback proxy server, the resulting user experience should not be construed as limiting the invention.

In an exemplary embodiment, a transfer may be implemented by extending RTSP to include a PROXY_TRANSFER request and/or a CONTINUE request. In particular, when a proxy server detects that a network outage is likely to occur, the proxy server may send a PROXY_TRANSFER to the client device. The PROXY_TRANSFER request shares some functionality with the existing REDIRECT request, but differs in a number of aspects. In particular, the PROXY_TRANSFER does not require a session teardown. Thus, the primary proxy server may send a PROXY_TRANSFER, which includes the domain or IP address for the failback proxy server, to the client device. The PROXY_TRANSFER indicates to the client that the client should continue the session, maintaining the existing parameters of the session, with the failback proxy indicated by the included URL specified in the Location header.

For example, a server might send the following PROXY_TRANSFER request to transfer a session to the failback proxy failbackproxyserver.com:8001
   PPS->C PROXY_TRANSFER failbackproxyserver.com:8001
     CSeq: 8
     Location: rtsp://contentserverurl.com/streamdata
     Session: 87654321
In this pseudo-code, the notation "PPS->C" indicates the request is sent by the primary proxy server (PPS) to the client (C). The notation "FPS" may also be used to represent the failback proxy server. A PROXY_TRANSFER request indicates that the session identified by a certain RTSP URL (e.g., rtsp://contentserverurl.com/streamdata in the Location header) and having certain session parameters, which may be specified by "CSeq" and "Session," among others, should be transferred to the failback proxy server identified by value in the PROXY_TRANSFER method (e.g., failbackproxyserver.com:8001). "CSeq" indicates the request number at the server (in the above example, the 8th request) and the "Session" parameter indicates the Session ID for the particular session.

In an exemplary embodiment, the "Location" parameter may simply indicate the location of the original content (e.g. the URL for the Content server. Thus, the client device receiving a PROXY_TRANSFER request may determine the failback proxy server with which to continue the session by connecting to the failback proxy server. The process of establishing a connection to the failback proxy server may be carried out in the transport layer and kept transparent to the client. For example, a client receiving the above PROXY_TRANSFER request could continue the session by connecting to the failbackproxyserver.com and streaming content from the RTSP URL rtsp://contentserverurl.com/streamdata, which is created using the "Location" parameter. As such, the client device may send a response to the identified failback server, upon receiving a PROXY_TRANSFER request.

Provided with the session information, the failback proxy may continue the streaming media session with the client device. The session information, providing all required information about the stream, is passed between the primary proxy server and the failback proxy server so that the failback proxy server can continue the stream without interruption. The session information sent to the failback proxy server may include client information such as the IP address of the client, the client type, and the client's capabilities, as well session information such as the IP address of the primary proxy server, proxy side port information, a stream URL, stream type, duration of the stream, etc.

To continue the streaming session, the failback proxy server may be configured to send an RTSP CONTINUE request to the client device. For example, the failback proxy server may send the following CONTINUE request:
   FPS->C CONTINUE rtsp://contestserverurl.com/streamdata RTSP/1.0
     CSeq: 8
     Session: 87654321
     Range: npt=55.02 (Optional)
In such embodiments, the progress indicator is implemented by the "Range" parameter. Thus, the above CONTINUE request indicates that the session should be transferred at npt=55. The Range parameter may also include a "time=" value (not shown), which marks the absolute latest time when the transfer can occur. While the range value for "npt=" must be included and set to the beginning ("0–"), the range value may be ignored when the time value is included.

The location of the original content, which is included in the "Location" parameter of the request, may be passed between the Primary proxy and the Failback proxy via a "Session" parameter. In such embodiments, the PROXY_TRANSFER may not include a "Location" parameter. Thus, the PROXY_TRANSFER and CONTINUE requests may be as follows:
   PS->C PROXY_TRANSFER failbackproxyserver.com:8001
     CSeq: 8
     Session: 87654321

FS->C CONTINUE rtsp://contentserverurl.com/stream-
  data RTSP/1.0
  CSeq: 8
  Session: 87654321

In any embodiment, the client may send a PLAY request to the failback proxy in order to continue the streaming media session via the failback proxy. For example, the client might send the following PLAY request:

C->FS PLAY rtsp://contentserverurl.com/streamdata
  RTSP/1.0
  CSeq: 8
  Range: npt=55.02
  Session: 87654321

The client may send a PLAY request to the failback proxy in response to receiving a CONTINUE request, or in response to receiving PROXY_TRANSFER request. Once a client determines that it will respond with a PLAY request, the client may wait a predetermined period of time before sending the PLAY request (to allow the failback proxy time to receive the session information, configure the session with the content server, etc.).

In an alternative embodiment, a session may be transferred to a failback proxy without using a CONTINUE request. As such, the PROXY_TRANSFER request may also include a progress indicator, which may indicate the point where the transfer occurred or will be occurring (in the scenario where the primary proxy anticipate the interruption and transfer the session before the interruption actually occurs). A client receiving such a PROXY_TRANSFER request, including a progress indicator, may then send a PLAY request to the failback proxy identified by the PROXY_TRANSFER request.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for providing streaming media to a client device, the method comprising:
  while a streaming media session is ongoing between a content server and a client device via a first proxy server, the first proxy server determining that an interruption in the streaming media session is going to occur and responsively:
    the first proxy server sending session information to a second proxy server, the session information comprising (i) information identifying the streaming media session, (ii) an identifier for the client device, and (iii) a progress indicator that indicates a continuation point within the streaming media session, wherein the continuation point is at or near a point in the streaming media when the first proxy server determines that the interruption is going to occur; and
  after the session information is sent, continuing the streaming media session between the content server and the client device via the second proxy server, wherein continuing the streaming media session comprises the second proxy server using the progress indicator to resume the streaming media session with the client device at the indicated continuation point.

2. The method of claim 1, further comprising the first proxy server, responsive to the determination that an interruption in the streaming media session is going to occur, sending a transfer request to the client device.

3. The method of claim 1, wherein continuing the streaming media session via the second proxy server further comprises the first proxy server or the second proxy server sending a transfer request to the client device.

4. The method of claim 3, wherein the transfer request is an RTSP PROXY_TRANSFER request.

5. The method of claim 1, wherein continuing the streaming media session via the second proxy server further comprises the first proxy server or the second proxy server sending a continuation request to the client device.

6. The method of claim 1, wherein the continuation request is an RTSP CONTINUE request.

7. The method of claim 1, wherein the first proxy server determining that an interruption in the streaming media session is going to occur comprises the first proxy server determining that a communication path between the first proxy server and the client device will be unavailable.

8. The method of claim 1, wherein the first proxy server determining that an interruption in the streaming media session is going to occur comprises the first proxy server determining that quality of service over a communication path between the first proxy server and the client device will be reduced.

9. The method of claim 1, wherein the first proxy server determining that an interruption in the streaming media session is going to occur comprises the first proxy server determining that the first proxy server will be shutting down or reducing the quality of service being provided to the client device.

10. A system for providing streaming media to a client device comprising:
  a first proxy server configured to, while a streaming media session is ongoing between a content server and the client device via the first proxy server, determine that an interruption in the streaming media session is going to occur, and in response to a determination that an interruption is going to occur, send session information to a second proxy server to facilitate a transfer of the streaming media session from the first proxy server to the second proxy server, the session information comprising (i) information that identifies the streaming media session, (ii) an identifier for the client device, and (iii) a progress indicator that indicates a continuation point within the streaming media session, wherein the continuation point is at or near a point in the streaming media when the first proxy server determines that the interruption is going to occur,
  wherein the second proxy server is configured to receive the session information and responsively: (i) send a continuation request to the client device and (ii) use the progress indicator to resume the streaming media session between the content server and the client device at the indicated point.

11. The system of claim 10, wherein the first proxy server is a primary proxy server.

12. The system of claim 10, wherein the second proxy server is a failback proxy server.

13. The system of claim 10, wherein the first proxy server or the second proxy server is configured to, after a determination that an interruption in the streaming media session is going to occur is made, send a transfer request to the client device.

14. The system of claim 13, wherein the transfer request comprises an RTSP PROXY_TRANSFER request.

15. The system of claim 10, wherein the second proxy server is further configured to, in response to receiving the session information, send a continuation request to the communication device.

16. The system of claim 15, wherein the continuation request comprises an RTSP CONTINUE request.

* * * * *